Aug. 17, 1954 G. DEAKIN 2,686,836

TRAFFIC RECORDING SYSTEM FOR AUTOMATIC TELEPHONE EXCHANGES

Filed Nov. 19, 1949

INVENTOR
GERALD DEAKIN
BY Robert Harding Jr.
ATTORNEY

Patented Aug. 17, 1954

2,686,836

UNITED STATES PATENT OFFICE 2,686,836

TRAFFIC RECORDING SYSTEM FOR AUTOMATIC TELEPHONE EXCHANGES

Gerald Deakin, New York, N. Y., assignor to International Standard Electric Corporation, New York, N. Y., a corporation of Delaware Application November 19, 1949, Serial No. 128,315

11 Claims. (Cl. 179—9)

This invention relates to an arrangement for automatically counting and recording information indicative of the traffic conditions existing in an automatic telephone exchange. More particularly the invention pertains to means for obtaining a record of the number of calls established through an automatic telephone exchange.

It is highly desirable in telephone systems of today to be able to obtain an accurate daily figure as to the number of calls handled by the switching equipment at any particular telephone exchange office. Such a daily figure is useful over a period of time for determining or checking the capacity of a particular office to handle the volume of traffic encountered and for purposes of aiding in the determination of toll charges for subscribers served by the exchange. For many purposes it is necessary to obtain a measurement of traffic which is indicative of a much smaller integer of time. For instance, the maximum demand on the switching equipment under ordinary circumstances would occur during a relatively small part of the day, this being referred to as the "busy hour traffic" period. In order to analyze the distribution of traffic during this busy period the recording equipment must be instantaneous in its action and either readily accessible for visual observance or inherently capable of automatically associating a time element with the traffic count.

Recording arrangements of this general class which are known usually require additional relays and other relatively expensive components at the central exchange besides the actual device for forming the record. Certain types of traffic recorders may be used with the selector equipment at the central exchange but this necessitates modifications in the selector itself and also requires other components not usually required in the operation of the exchange.

In accordance with this invention there is provided a novel system for recording traffic distribution in an automatic telephone exchange which possesses the desired features mentioned above and which offers a substantial saving in both the installation and the maintenance costs over those previously known. The system is readily adaptable to existing exchange equipment and affords a great deal of flexibility in its applications to traffic distribution problems.

Briefly the recording system of this invention utilizes the relatively high voltage generated when the inductive circuit of a release relay is broken at the end of a particular call or connection to provide the energy necessary to perform the actual recording operation.

According to one feature of this invention this inductive voltage is amplified to a value sufficient to directly control a call register.

According to another feature of this invention a gas discharge device is connected to each of the individual release relays of the connecting circuit of an automatic exchange, and a recording of the release of each of the relays is made under control of the discharge tubes. This is preferably accomplished by recording the flash discharge of the gas tubes on a register or on a photo-sensitive recording medium.

The above-mentioned and other features and objects of this invention and the manner of attaining them will become more apparent and the invention itself will be best understood by reference to the following descriptions of embodiments of the invention taken in conjunction with the accompanying drawings, wherein.

Figures 1, 2, 3, 4:
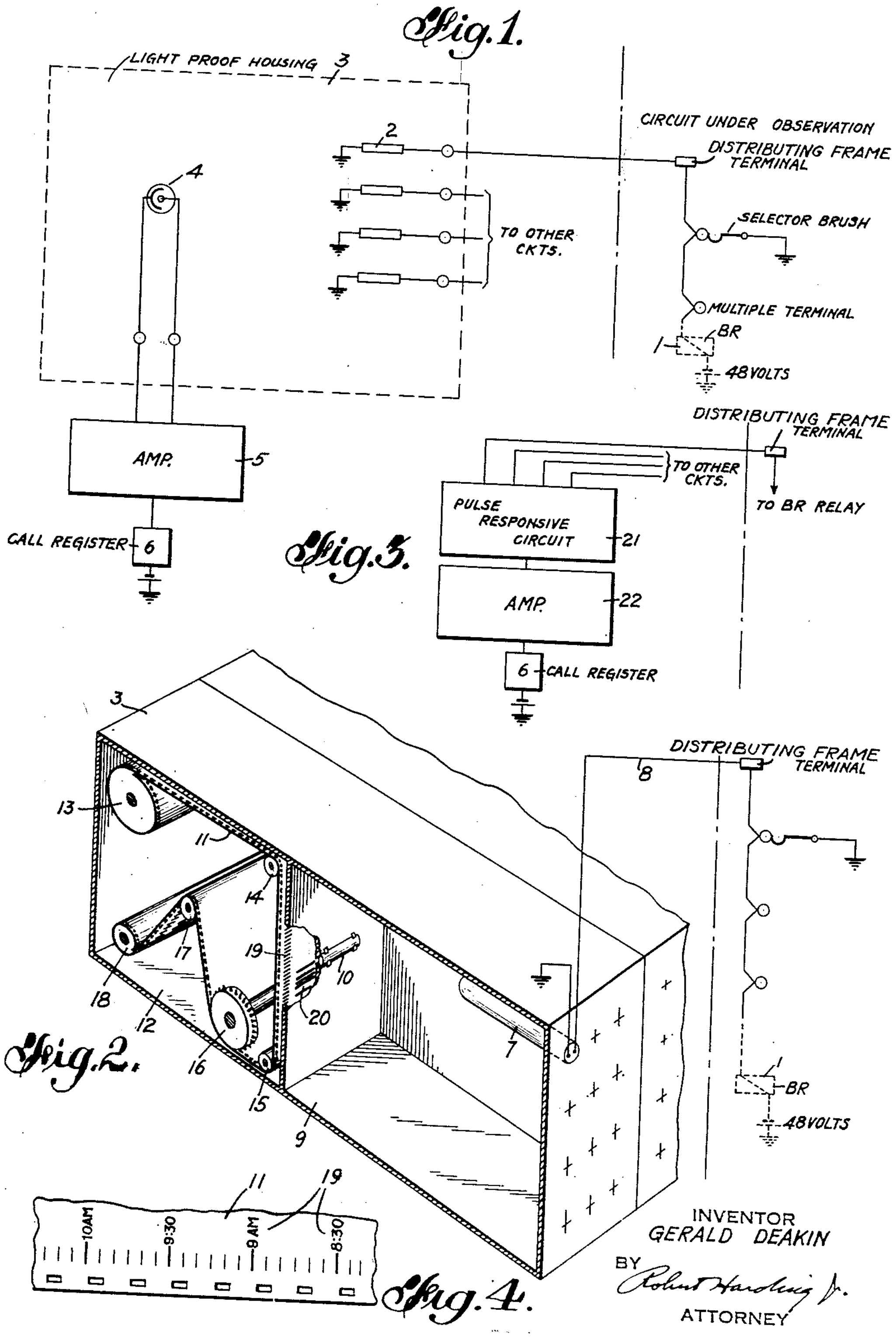
Figure 1 is a schematic representation of the recording system illustrating a first embodiment of the invention.
Figure 2 is a schematic representation of the system illustrating a second embodiment of the invention.
Figure 3 is a schematic representation of a modification of the embodiment shown in Figure 1.
Fig. 4 is a detailed view of a section of a recording film of Fig. 3.

With reference to the drawings, there is shown schematically, a portion of the automatic switching system forming the subject matter of my U. S. Patent No. 2,484,060. It must be understood that the exchange circuitry shown is by way of illustration only and that the actual recording arrangement may be used in conjunction with any similar automatic or semi-automatic telephone exchange.

In Figure 1 there is shown a BR relay 1 of the system described in the above-mentioned patent which operates when a calling line is picked up by the first line finder through the action of the selector switch brushes. The BR relay is taken for purposes of illustration only and it will become readily apparent to one skilled in the art that any similar relay might be chosen depending upon the traffic distribution to be observed.

The circuit of the BR relay 1 is connected through a distributing frame terminal of the exchange to a neon tube 2 enclosed in a lightproof housing as indicated at 3 in Figure 1. A plurality of similar tubes are mounted within the housing 3 and are connected similarly to other circuits of the exchange. A light cell 4 is mounted within the lightproof housing adjacent the bank of neon tubes and is connected to a light cell amplifier 5 which may be mounted within the housing or at any suitable location remote therefrom. The output of the light cell amplifier is in turn utilized to drive a standard call register 6 which may be placed at any location in the exchange that provides ready accessibility for visual observance.

It may be seen that upon opening of the ground via the selector brush, the circuit for relay 1 will be broken and will cause the release of the relay 1. The "inductive kick" voltage generated by this relay will appear across the neon tube 2. The neon tube will fire momentarily producing a light flash which will energize the light cell 4. The energy thus produced by the light cell 4 is then amplified by the amplifier 5 to a sufficient value to actuate the call register 6.

A plurality of similar lightproof cells may be provided, each comprising a similar bank of neon tubes and a light cell associated with each of the banks.

The output of the individual light cells may be fed through a common amplifier to a single call register or may be further subdivided by providing a plurality of such registers for each of the predetermined group of such cells.

The neon tubes of the arrangement described above produce an additional desirable effect in that they act as spark quenchers for the inductive circuits of the relays involved.

Inasmuch as it is possible that two switches may release simultaneously and thereby give only a single indication, the number of neon tubes constituting a single bank will depend on the number of calls handled per unit of time during the busiest period of the day as well as on the accuracy desired. If register 6 has an operating time of .050 sec. it will be able to handle approximately 20 releases a second. If the bank consisted of, for example, 1000 tubes, only approximately one-tenth of the number of switches connected thereto would normally be operated at any one time. If the average call is estimated to last three minutes, somewhat less than 35 switches would release per minute and the number of times two or more switches would release simultaneously would occur so seldom as to be negligible for all practical purposes.

In Figure 2 there is illustrated a second embodiment of the invention which provides for the direct recording of the neon flashes on a multi-channeled film or similar sensitive paper.

The system of Figure 2 comprises a plurality of neon tubes 7 mounted within a lightproof housing 3 in a manner similar to that shown in the embodiment of Figure 1. Each of the neon tubes is under the control of a single release relay in the telephone exchange as shown for a single tube in Figure 2 at 8. The lightproof housing in the arrangement of Figure 2 is subdivided into a plurality of lightproof chambers 9 each of which contains a similar bank of neon tubes as that shown in Figure 2. Each of the chambers 9 is provided with a lens system 10 which is capable of receiving light from any of the tubes in a particular bank.

Adjacent the lens systems there is provided a multichannel film 11 which is mounted within a common chamber 12 and is positioned to receive light focused thereon by all the lens systems of the respective chambers 9, each of the channels registering flashes from a single chamber of the plurality. The film 11 is carried in the chamber 12 of the composite housing on a roller member 13. The film is fed from roller 13 over pulley member 14 past the respective lenses of each chamber 9 to pulley 15 and on to feed sprocket 16 which is operative by motive means (not shown) to engage the film and advance it at a constant rate of speed. The film is then fed over pulley member 17 on to a re-wind roller 18 which is continually tensioned to take up any slack in the film.

It may be seen that the arrangement as above described is operative to directly record the neon flashes on the constantly advancing film medium through the action of the lens systems provided.

The film or sensitive paper may be provided with timing indications or marks 19, more clearly shown in Fig. 4, which correspond to the rate of advance of the constantly moving feed sprocket 16 so as to provide a ready reference with respect to the recorded flashes during any particular time that the mechanism is running. Through the action of the individual lens systems, the light flashes from the neon tubes will appear on the sensitized paper as finely defined lines, one line corresponding to a single firing of a neon tube as illustrated at 20 in Figure 2. To obtain the traffic pattern during any particular period it is merely necessary to count the number of lines 20 appearing on the sensitized paper between the desired time indication limits 19 carried thereon.

A section of the film or sensitive paper 11 is illustrated in Fig. 4 in order to show the timing indications 19 which serve to indicate the time of the day in which the flash marks appearing thereon were made. The timing indications will, of course, have to be made proportional in accordance with the speed at which the film is advanced.

It must be understood that any similar arrangement or feed mechanism for the sensitized paper could be provided, the arrangement thus disclosed being used for purposes of illustration only.

In the modification illustrated in Figure 3 of the drawings, the operation is such that the back electro-motive force generated by the release of a relay such as the BR relay 1 of Fig. 1 is amplified and directly utilized to actuate the call register.

As shown in Figure 3, the inductive "kick voltage" generated upon release of a particular relay, is fed from the distributing frame terminal, in the same manner as shown in Figure 1, to a pulse responsive circuit 21. The function of the pulse responsive circuit is to suitably shape and pass only the peak value of the voltage generated by the release of relay 1. This "peaked voltage" is then fed to a common amplifier 22, amplified to a value sufficient to actuate the call register 6, and then applied to the control circuit of the register.

While I have described above the principles of my invention in connection with specific apparatus, it is to be clearly understood that this description is made only by way of example and not as a limitation to the scope of my invention.

What I claim is:

1. In an automatic telephone exchange, a traffic recording system comprising a plurality of inductive control circuits each being energized during the establishment of respective calls through said exchange and adapted to deliver an inductive kick upon deenergization thereof, pulse responsive means adapted to radiate energy upon receipt of an inductive kick, circuit means connecting said control circuits to said pulse responsive means to transfer an inductive kick to said pulse responsive means from said control circuits, and recording means responsive to radiated energy, in energy-receiving relation with said pulse-responsive means for automatically recording the release of said inductive control circuits.

2. A traffic recording system as claimed in claim 1, wherein said pulse responsive means comprises a plurality of electron discharge devices, a different one of said devices associated with each of said control circuits.

3. In an automatic telephone exchange having a plurality of inductively controlled relays, each being energized during the establishment of a particular connection through said exchange and adapted to deliver an inductive kick upon deenergization thereof, a traffic recording system comprising a plurality of discharge devices, each adapted to discharge upon receipt of an inductive kick, circuit means connecting each of said discharge devices to a different one of said relays to transfer an inductive kick to said devices from said relays, and recording means responsive to discharged energy, in discharge-energy-receiving relation with said discharge devices for recording the incidence of operation of said relays.

4. A traffic recording system as claimed in claim 3, wherein said discharge devices comprise neon tubes and said system further comprises a substantially light-proof housing, each of said neon tubes mounted within said housing, said recording means comprising light-sensitive means mounted within said housing adjacent said neon tubes in light-sensitive relation therewith said light-sensitive means adapted to respond to the discharge of each of said neon tubes.

5. In an automatic telephone exchange having switching circuits operative to establish connections through said exchange; a traffic recording system comprising, a plurality of control relays each being operatively positioned within respective switching circuits of said exchange and having contacts controlling predetermined operations of said switching circuits, each of said relays having an inductive control circuit adapted to deliver an inductive kick upon release of said relays, pulse responsive means adapted to radiate energy upon receipt of an inductive kick, circuit means connecting said inductive control circuits to said pulse responsive means, to transfer an inductive kick to said pulse responsive means said pulse responsive means being operative to be energized solely by the induced voltage generated in said inductive control circuits when respective control relays are released and radiation-responsive means controlled by energy radiated by said pulse responsive means in energy-receiving relation with said pulse responsive means and for recording the release of said control relays.

6. In an automatic telephone exchange having switching circuits operative to establish connections through said exchange; a traffic recording system comprising, a plurality of control relays each being operatively positioned within respective switching circuits of said exchange and having contacts controlling predetermined operations of said switching circuits, each of said relays having an inductive control circuit adapted to deliver an induced voltage upon release of said relays, a plurality of gas discharge devices each being electrically connected to the inductive control circuit of a respective relay of said plurality, each of said discharge devices being operative to be discharged solely by the induced voltage generated in said inductive control circuits when its associated control relay is released and discharge detection means controlled by said discharge devices for recording the release of said control relays.

7. A traffic recording system for automatic telephone exchanges comprising a plurality of gas discharge devices mounted within a substantially light-proof housing, means controlled by the release of respective calling connections through said exchange for developing an inductive kick for operating said discharge devices, a light sensitive cell mounted within said light-proof housing being energized in response to the operation of said discharge devices and a call register controlled by said light sensitive cells for recording the number of calls passing through said exchange.

8. A traffic recording system for automatic telephone exchanges comprising a plurality of gas discharge devices responsive to an inductive kick mounted within a light-proof housing, means controlled by the release of respective calling connections through said exchange for developing an inductive kick for operating said discharge devices, means energized in response to the operation of said discharge devices for recording the number of calls passing through said exchange against a time base indication.

9. In an automatic telephone exchange having a plurality of individual relay controlled connecting circuits therein each of said circuits adapted to deliver an induced voltage upon release of its associated controlling relay, a traffic recording system comprising, a plurality of gas discharge devices, each of said gas discharge devices adapted to radiate light being electrically connected to an individual relay of a particular connecting circuit such as to be discharged solely by said induced voltage on release of said relay, recording means against a time base operated in response to radiations of said discharge devices for recording against a time base the release of respective relays associated with said connecting circuits.

10. A traffic recording system for automatic telephone exchanges comprising a plurality of gas discharge devices responsive to an inductive kick mounted within a substantially light-proof housing, means controlled by the release of respective calling connections through said exchange for developing an inductance kick for operating said discharge devices, light sensitive means mounted within said light-proof housing being operative to directly record the operation of said discharge devices against a predetermined time base.

11. A traffic recording system as set forth in claim 10 wherein said light sensitive means comprises a multi-channeled film mounted within said light-proof housing adjacent said discharge devices, said film having a series of spaced timing indications thereon and adapted to be advanced past said discharge devices at a constant rate of speed.

References Cited in the file of this patent

UNITED STATES PATENTS

| Number | Name | Date |
|---|---|---|
| 1,194,378 | Goodrum | Aug. 15, 1916 |
| 2,392,890 | Vincent et al. | Jan. 15, 1946 |
| 2,399,682 | Kucera | May 7, 1946 |